No. 794,802. PATENTED JULY 18, 1905.
C. L. HORACK.
BRAKING DEVICE.
APPLICATION FILED MAR. 16, 1905.
2 SHEETS—SHEET 1.
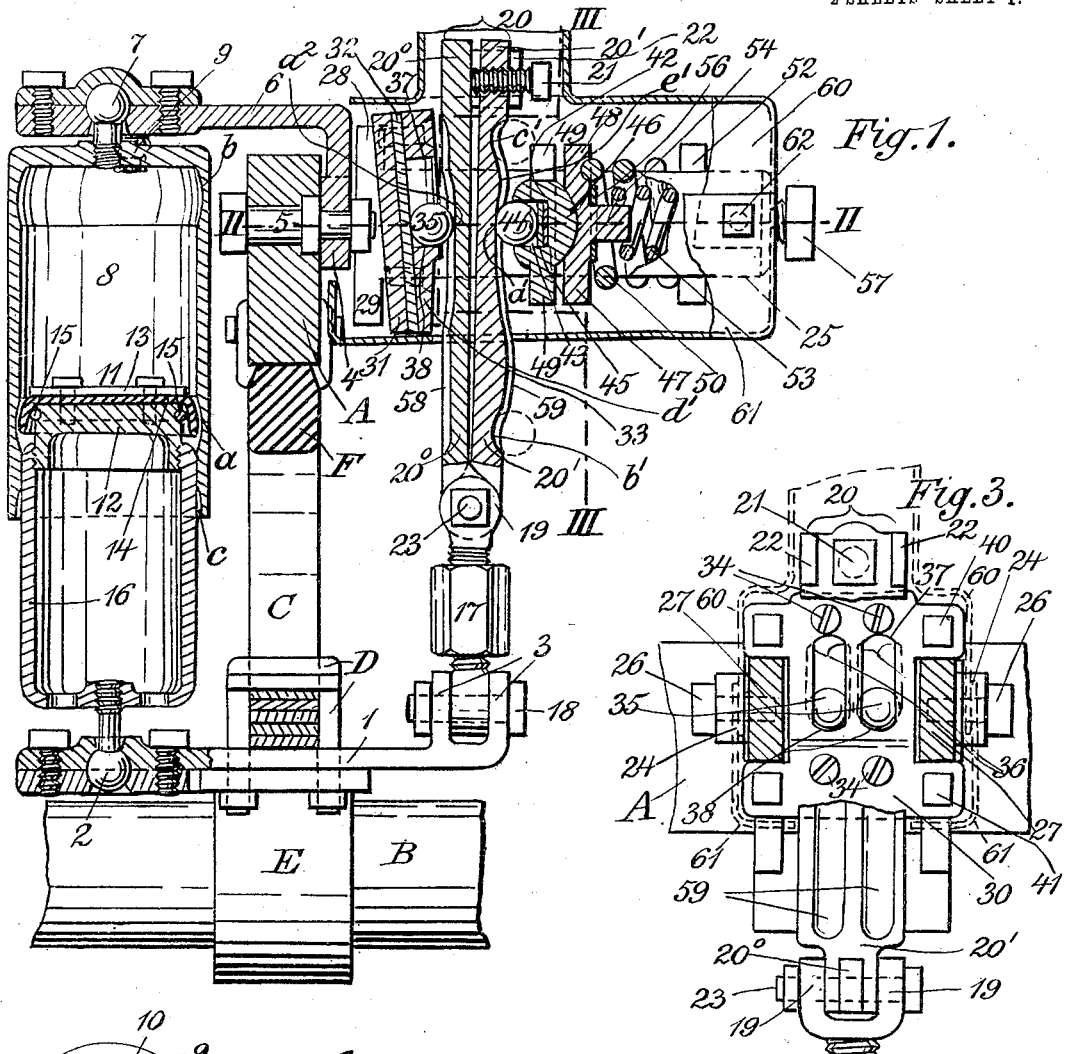
Witnesses:
John A. Caldwell
William Shaw
Inventor:
Charles L. Horack

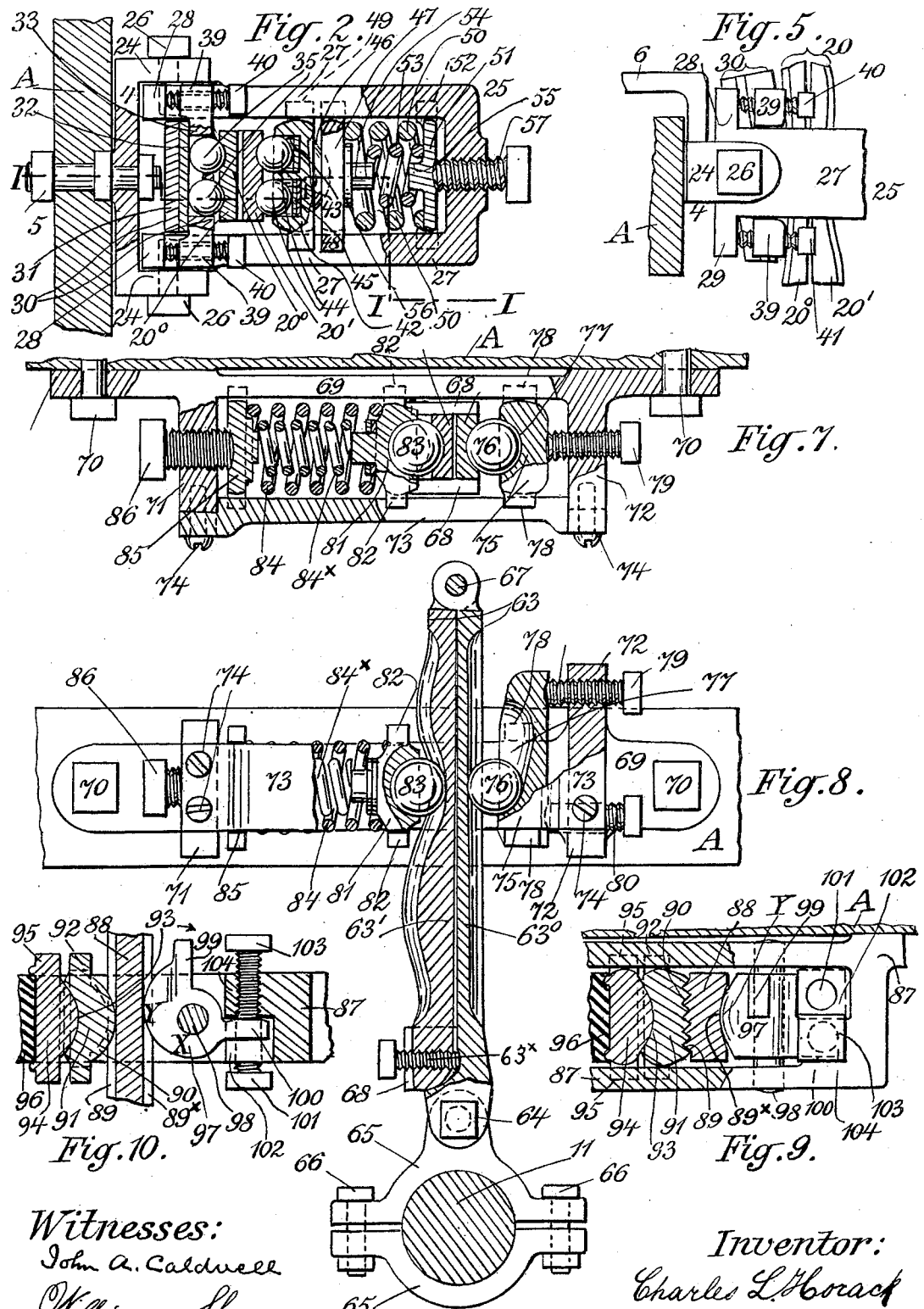

No. 794,802. Patented July 18, 1905.

UNITED STATES PATENT OFFICE.

CHARLES L. HORACK, OF NEW YORK, N. Y.

BRAKING DEVICE.

SPECIFICATION forming part of Letters Patent No. 794,802, dated July 18, 1905.

Application filed March 16, 1905. Serial No. 250,422.

*To all whom it may concern:*

Be it known that I, CHARLES L. HORACK, a citizen of the United States, residing at New York, borough of Brooklyn, county of Kings, and State of New York, have invented certain new and useful Improvements in Braking Devices, of which the following is a specification.

My invention refers to braking devices of various kinds for resisting relative movements of portions of a structure by friction and also and more particularly for resisting such movements where the same produce actions and reactions of a spring interposed between or co-acting with said relatively movable portions.

The objects of my invention are to provide simple and efficient braking mechanisms either in combination with a spring whose actions and reactions are controlled thereby or without such a spring, wherein it may be possible to vary the resistance exerted by the braking device during different stages of relative movements of the portions of a structure and to make provision for having said devices out of action during certain stages of such movements; also, to make such braking devices capable of acting during relative movements of the portions of the structure in various directions and in various planes; also, to permit of readily regulating, adjusting, and modifying their actions. I accomplish these and other useful objects by the means hereinafter specified, and set forth more particularly in the claims.

As my improvements are especially applicable to the regulation of the actions of cushioning-springs in vehicles, I have in the accompanying drawings illustrated the combination of a braking device constructed according to my invention with a spring interposed between the seat portion and the wheel portion of a vehicle and will hereinafter more particularly refer to such a case, without, however, limiting myself to such employment of my improved braking device, as the same might, for instance, be used as a door-check or for moderating and counteracting vibrations and shocks produced in various kinds of machinery.

In the accompanying drawings, Figure 1 is a vertical section, partly in elevation, of portions of a vehicle with a cushioning-spring interposed between the same and my improved brake mechanisms combined therewith, such section extending along line I I in Fig. 2, said Fig. 2 being a section along line II II in Fig. 1, portions of the device, however, being shown in top view. Fig. 3 is a section along line III III in Fig. 1, and Fig. 4 a top view of portion of Fig. 1. Fig. 5 is a side view of portion of my improved device with the vehicle-body to which it is attached shown in section. Fig. 6 is an end view, on a reduced scale, of my improved device with the vehicle-body to which it is attached. Figs. 7, 8, 9, and 10 illustrate modifications of portions of my improved braking device, Fig. 7 being a longitudinal horizontal section of the same, partly in top view, and Fig. 8 a longitudinal vertical section, partly in side view, of one of such modifications, and Figs. 9 and 10 corresponding views of the principal portion of another such modification.

Corresponding letters and figures of reference throughout the different views refer to corresponding parts.

Referring first to Figs. 1 to 6, inclusive, A indicates a side girder of a vehicle, such as an automobile, B one of the axles, and C a cushioning-spring interposed between parts A and B and constructed of a multiplicity of leaves extending in the same plane with girder A. D D are yokes employed in usual manner to confine said leaves in their proper relative positions and to secure the same to a bearing E of axle B. F is an elastic bolster or auxiliary cushioning-spring secured to girder A and made of any suitable material, but preferably made of rubber and adjusted to be out of action during the early stages of compression of spring C and during the later stages of its reaction and to resist its compression to its elastic limit, so as to guard against flattening of said spring. 1 is a bar interposed between the leaves of spring C and bearing E and firmly held in position there by yokes D. Said bar at one end is provided with a universal joint 2 and at the other end with lugs 3, placed parallel with girder A and spring C. 4 is a bracket hinged to body A by a bolt 5 and provided with a rearward-extending arm 6, which carries a universal joint 7, interposed between said arm and a cylinder 8, open at its lower end. 9 is a check-valve in said cylinder, opening upward. Said valve may also be provided with a minute perforation 10 therein, in connection with which any suitable device may be employed for adjusting its operative area. 11 is a piston comprising a disk 12, another disk 13, and a flexible cup 14, interposed between said disks, parts 12, 13, and 14 being held together by screws. 15 is a spring made of wire in form of a split ring and so inserted in a suitable groove on the circumference of disk 12 as to normally force the flange of cup 14 outward against the walls of cylinder 8. Disk 12 is screwed to a tubular piston-rod 16, which connects at its lower end by screw-thread with universal joint 2. While cup 14 normally closely contacts with the walls of cylinder 8, said walls are cut out sufficiently at $a$, directly opposite the position occupied by piston 11 when spring C is in its normal condition due to normal tension produced by the usual load thereon while the vehicle is standing still, that no frictional contact takes place there between cylinder and piston. The walls at the ends of the cylinder at $b$ and $c$ are cut out in similar manner, so as to also do away with such frictional contact there when spring C has reached its extreme limits of expansion and contraction as permitted by buffer or auxiliary spring F. The operation of this part of the device is as follows: As spring C is being compressed, piston 11 will be forced upward within cylinder 8, whereby check-valve 9 will be forced open and the air in the upper portion of the cylinder will be expelled therefrom, the flange of cap 14 meantime hugging the walls of the cylinder until it comes opposite the receding portion $b$ of the same at the time that spring C comes in contact with bolster F when reaction of said spring begins, and in consequence the piston begins to again move downward. As check-valve 9 is then closed, there will be a tendency to form a partial vacuum above the piston, which will resist reaction of spring C until the piston reaches a position opposite $a$, when the inflow of air upward around said piston, together with the flow of air through perforation 10, will equalize the pressures above and below the piston. Upon further upward expansion of spring C the piston will travel from $a$ to $c$, and again a partial vacuum will be produced above the piston during such travel until it becomes neutralized as the piston reaches point $c$ and said spring again receives compression and the piston starts on its upward travel. The recesses in the walls of the cylinder at $a$, $b$, and $c$ may be made of such slight depths that while opposite such points the friction between the flanges of cap 14 will be reduced said flanges may still form air-tight joints at such points, and in that case it will be possible to introduce a liquid, such as oil or glycerin, above the piston for assisting in making such joints tight.

17 is a turnbuckle hinged to lug 3 by a bolt 18 and provided at its upper end with lugs 19, placed at right angles to lugs 3.

20 is a compound brake-bar comprising a member $20^0$ and another member $20'$, a screw 21, passing through member $20'$ and resting on member $20^0$, and lugs 22, integral with member $20^0$ and extending close to member $20'$ on both sides thereof, so as to guard against relative lateral displacements of the upper ends of said members.

23 is a pin passing through lugs 19 and through the lower ends of members $20^0$ and $20'$, so as to permit said members to oscillate around the same independently and jointly toward and away from girder A.

24 24 are two lugs at the ends of and forming parts of bracket 4.

25 is a U-shaped bracket fulcrumed to lugs 24 by bolts 26.

Bar 20 travels up and down between the arms 27 of bracket 25 upon compression and expansion of spring 12.

28 28 are abutments extending upward, and 29 29 abutments extending downward, from the rear ends of arms 27.

30 is a frame or casing placed between bar 20 and vehicle-body 10. Said frame comprises a rear plate 31, a central plate 32, preferably made of a hard metal, and a forward plate 33, all joined together by screws 34.

35 35 are hardened bearing-balls confined between plate 32 and plate 33, slots 36 of widths smaller than the diameters of said balls being provided on plate 33 for guiding said balls upward and downward and for confining the same between parts 32 and 33, and shoulders 37 and 38 being provided on plate 33, against which said balls come to rest when forced into their extreme upper and lower positions.

39 39 are lugs on frame 30. They fit upon the upper and lower surfaces of arms 27, so as to be capable of sliding along the same.

40 40 are screws passing through upper lugs 39 and resting against abutments 28 28, and 41 41 screws passing through lower lugs 39 and resting against abutments 29 29.

42 is a frame or casing provided on its rear face with two sockets 43 43, into which hardened bearing-balls 44 are made to fit, so as to prevent rolling of said bars within said sockets. 45 45 are thin removable disks in said sockets for adjusting the extent to which said balls are to project outside of the same. Portion 46 of the front face of frame 42 is constructed as portion of a sphere which fits into and is permitted to revolve within a recess in a frame 47, so as to form in conjunction therewith a universal joint, whereby further provision is made to guard against binding of bar 20 upon brake-shoes 44. Said frame 47 by means of lugs 48 is guided along the upper and the lower surfaces of arms 27.

49 represents lugs on frame 42, adapted to alternately engage with arms 27, so as to allow for the play required in said universal joint.

50 is a spiral spring inserted between frame 42 and a plate 51, made to ride upon arms 27 by means of its lugs 52. 53 is a second spiral spring guided by suitable studs 54 and 55, provided on frame 47 and plate 51, respectively. Said spring does not receive tension as quickly as spring 50, but is made of such length that it will become compressed only after spring 12 has been compressed to a predetermined extent, when it will serve to reinforce spring 50 during greater compressions and reactions of spring 12. The extent to which said spring 50 shall first be so compressed may be adjusted by means of washers, as 56, placed around one or both of the studs 54 and 55.

57 is a screw passing through yoke 25 and bearing upon plate 51 and preferably so adjusted as to hold balls 35 and 44 in contact with brake-bar 20 when the same is in its normal position, as shown in Fig. 3, without, however, producing such pressures as would create braking action there upon movement of said brake-bar with reference to said brake-shoes.

On the rear face of member $20^0$ of brake-bar 20 parallel longitudinal grooves 58 are provided, in which balls 35 are made to travel when spring 12 is being actuated or is reacting and is thereby imparting movements to bar 20, and on the front face of member 20' parallel longitudinal grooves 59 are provided, within which balls 44 are made to travel during such movements of said bar. The bearing portions of said grooves form longitudinal cam-surfaces, as shown more particularly in Fig. 3, wherein grooves 58 are made to recede at A and wherein grooves 59 are made of undulating configurations, for reasons hereinafter explained. The lengths of grooves 58 and 59 slightly exceed the full extent of the play of spring 12 as limited by buffer 16.

In means for regulating the actions and reactions of a cushioning-spring for vehicles it is desirable for the purpose of securing the greatest comfort to passengers, providing such a spring be sufficiently sensitive, not to interfere materially with a very moderate play of such a spring in either direction above and below its normal position, which position the spring is assumed to occupy in the drawings. Further, when play of such a spring takes place beyond the very moderate stages above referred to or at all the stages of the play of a comparatively stiff spring it is best to offer greater resistance to reactions of the spring than to its compression or direct action; besides, to offer at least some resistance to any more extensive compressions or direct actions of the spring than the moderate actions above referred to; in addition, to guard against the spring reacting or rebounding much beyond its normal condition and also to guard against too great frictional resistance in such regulating means, particularly when after maximum movements of the spring in either direction such movement is being reversed. To comply with the first of above requirements, I make the bearing-surfaces on bar 20, which occupy positions directly opposite balls 35 and 44 when said bar is in its normal position, recede sufficiently to substantially do away there with any friction between said surfaces of said bar and balls 35 and 44 at points $a^2$ and $a'$, respectively, so as to leave spring 50 free from tension. This condition is illustrated in Fig. 3, wherein both on member $20^0$ and 20' the bearing-surfaces on said members above and below the positions of balls 35 and 44 are shown to be substantially parallel, so as to permit of slight up and down movements of bar 20 without displacing balls 35 upon frame 30 and without producing braking actions. However, in case spring 12 were a comparatively stiff spring I would prefer to dispense with such parallel surfaces. In general, I obtain greater resistance to reactions of spring 12 than to direct actions by giving to plate 32 an inclination downward toward member $20^0$, as under such conditions upward movement of the lower and thicker portions of bar 20 with reference to frame 30 coincident with direct action of spring 12 will bring the lower surfaces in the grooves on member $20^0$, which protrude beyond recess $a'$, in contact with balls 35, so as to roll the same upward along plate 32 and rearward toward vehicle-body 10 until said balls come to rest against shoulders 37, while simultaneously the lower cam-surfaces on member 20' will force ball 44 toward spring 50, so as to compress the latter and cause the same to yieldingly resist such movement of bar 20 by the braking action then produced between said bar and said ball, as well as ball 35, bar 20 at the same time slightly oscillating toward body 10. As bar 20 moves downward again its lower protruding portion will roll ball 35 downward until the same comes to rest against shoulder 38, and at the same time said ball will force bar 20 toward spring 50, thus further tending to compress said spring and to add to the braking action between said bar and said balls, and it is by these means that during reaction of the cushioning-spring 12 stronger braking action is produced than during its direct actions. During such downward movement bar 20 will oscillate back and away from part 10. During such oscillations bar 20 will to a slight extent partly revolve around balls 44 in the plane in which it oscillates. It will be observed that the inclination of plate 32 with reference to grooves 55 and 56 is the factor which determines the difference in braking actions produced during direct actions and reactions of spring 12. Thus assuming that said plate was placed parallel with said grooves there would be no difference in such braking actions, while by increasing the inclination of said plate downward and toward bar 20 by means of screws 40 or 41, or both, such difference may be produced and the extent of it adjusted. To provide some frictional resistance to direct actions of spring 12 beyond moderate stages, I make the bearing-surfaces on bar 20 bulge out to a sufficient extent at $d'$, and to counteract excessive reactions beyond the normal position of spring 12 I make said surfaces bulge out in similar manner at $e'$, and to avoid too great frictional resistance during reversals in the movements of said spring after its reaching the limits of its compression and expansion I make said cam-surfaces recede at points $b'$ and $c'$. One of the objects of providing the cam-surface $e'$ is to meet conditions which occur when a wheel of a vehicle strikes a hole in the road and when at first the tendency resulting therefrom is to increase the distance between the axle supporting the cushioning-spring C and the body of the vehicle where it rests upon said spring and to thereby separate the leaves of said spring and to cause a proportionately greater direct action of the spring immediately afterward. In providing frictional braking actions during direct actions of spring C—for instance, as balls 44 contact with point $d'$ or travel toward the same from their position at $a'$ and in also providing frictional braking actions during reactions of said spring beyond its normal positions as said balls contact with point $e'$ or travel toward the same from $a'$—I meet the conditions generally observed in the actions of cushioning-springs—viz., that the tendency of such a spring when a shock is imparted to it is to not only return after having been compressed to its original position, but to react beyond the same before finally returning to its original position. Point $d'$ is shown to protrude out farther than point $e'$. This provision is made because great shocks imparted to spring C must be counteracted quickly and forcibly as soon as possible after said spring begins to react after having been compressed to the limit provided by buffer F, while during late stages of such reaction, and particularly reactions beyond the normal position of spring C, the force producing the same has been neutralized to a considerable extent by the preceding braking action, the intensity of the braking actions being increased and decreased according to the extent to which at the various points the cam-surface on part 20, contacting with balls 44, protrudes more or less. It will be seen that while said balls contact with certain portions of said cam-surfaces the braking actions will be stronger during more extensive actions of spring C than during more moderate actions—as, for instance, when balls 44 move from $a'$ to $d'$ the intensities of the braking actions then keeping on increasing throughout said travel, while the opposite conditions will prevail when said balls move from $d'$ to $b'$. As in that case, while the direct action of spring C becomes more extensive the intensities of the braking actions are gradually becoming less. It will also be seen that the braking actions during certain parts of the travel of balls 44 will become stronger as the reactions of spring C become more extensive—as, for instance, while said balls move from $b'$ to $d'$, while the opposite conditions will prevail as they move from $d'$ to $a'$. It further appears that stronger frictional braking actions take place during certain parts of the travel forward and backward of balls 44 during extensive direct actions and reactions of the cushioning-spring than during more moderate actions, the greater braking actions taking place, for instance, as balls 44 travel from $a'$ to $d'$ and back, while such braking actions are more moderate when said travel is of less extent—as, for instance, between point $a'$ and a point half-way between $a'$ and $d'$—and that the opposite conditions prevail and weaker braking actions take place during more extensive actions and reactions of spring C than during more moderate actions and reactions—as, for instance, when said balls travel from $d'$ to $b'$ and back, as compared with their travel from $b'$ to a point half-way between $d'$ and $b'$ and back.

In making bar 20 sectional, as described, and thereby providing for varying the distances between its operative faces I am enabled to control in a measure the differences in braking actions to be produced during different stages of the compressions and reactions of spring 12 and to particularly increase the resistance to excessive reactions of spring 12. Besides, in case of injurious wearing of the bearing-surfaces on one of the members $20^0$ and $20'$ such member may be renewed without discarding the other one. By means of turnbuckle 17 I am enabled to properly adjust the position of bar 20 relative to the brake-shoes when spring 12 is in its normal position.

I prefer to protect the braking mechanism by means of a cover divided along yoke 25, the upper section 60 of the cover forming a hood of sufficient height to at all times entirely inclose the portion of bar 20 above said yoke, while the lower section 61 of said cover is open near the lower portion of said bar, so as to allow said portion to move into and out of said cover. The overlapping portions of said sections are secured to arms 27 by screws, as 62.

Besides the advantages which my improved construction offers, as above set forth, I obtain great flexibility throughout the structure, whereby the same will accommodate itself readily to any of the various and sudden relative displacements which constantly occur between the seat portion and the wheel portion of a vehicle, while I guard at the same time against binding between any of the parts of the structure during such movements. In employing hardened bearing-balls, as 35 and 44, as brake-shoes I not only obtain such spherical shoes at very low expense, but also permit of the brake-bar 20 assuming varying relative positions with reference to the same without varying the amounts of operative bearing-surfaces and without producing binding actions between the brake-bar and the brake-shoes. I am also enabled in case balls 44 should wear on one side to reverse the same and utilize their opposite sides. By having an independent bearing-plate, as 32, form part of frame 30 I am enabled to readily renew the same whenever necessary. By securing bar 1 between bearing E and spring C by means of yokes D, I firmly confine said bar and the joints integral therewith in their positions without the necessity of drilling any holes for such purpose in any portions of the vehicle. By employing an auxiliary spring, as 53, I am enabled to greatly add to the spring-power applied to the brake-shoes and the brake-bar when the latter departs considerably from its normal position. By making the yoke within which bar 20 moves up and down sectional I not only add to the flexibility of the device, but also greatly facilitate the mounting and adjustment of its parts. The air-cushioning device, embodying cylinder 8 and connecting parts, and the frictional braking device, embodying brake-bar 20 and the parts connecting therewith, are so arranged and proportioned that when ball 44 occupies the position indicated in dotted lines opposite part $b'$ of bar 20 piston 11 will be opposite part $b$ of cylinder 8 and that when ball 44 is placed in the position $c'$ the piston will be opposite points $c$ in said cylinder so that as reversals in the movements of said piston and said bar take place simultaneously perfect freedom will be allowed in such movements at those times.

While it will be observed that the air-cushioning devices may each be employed independent of the other for regulating the actions of spring C as well as the frictional braking mechanism, I prefer to employ the same jointly, as the frictional braking device will take care of rough shocks, while the air-cushioning device will moderate and soften the action of the same.

In place of the air-cushioning device above referred to any other suitable device of this character—as, for instance, the one illustrated in Fig. 2 of my United States Patent No 689,969—might be employed in combination with the frictional braking mechanism described.

By employing in combination with spring C a braking device for regulating and for yieldingly resisting the action of said spring and an auxiliary spring or bolster or buffer, as F, I am enabled to not only materially reduce the injurious tensions which would otherwise be imparted to spring C, but also to moderate and regulate the actions of said spring by a less powerful and much more sensitive braking device and having less play and being of smaller dimensions than would have to be employed otherwise.

In the modified braking device illustrated in Figs. 7 and 8 a compound brake-bar 63 is hinged at 64 to two clamps 65, secured to axle 11 by bolts 66. Said brake-bar consists of the two members $63^0$ and $63'$, jointed together at their upper ends by a pin 67, and of a screw $63^\times$, passing through member $63'$ and resting upon member $63^0$ for adjusting the relative positions of such members. 68 68 are lugs on member $63'$ for preventing relative lateral displacements of such members. 69 is a double bracket fixedly attached to body 10 by bolts 70, its two arms 71 and 72 extending forward and being connected by a bar 73, locking into suitable recesses in said arms and secured thereto by screws 74. Bar 63 passes through the yoke formed by said bracket and said bar 73. 75 is a frame similar to frame 30, but made of one piece and carrying only one ball 76, which is permitted to travel upward and downward within socket 77 on said frame. Frame 75 is provided with lugs 78, made to ride upon bracket 69 and bar 73. The inclination of frame 75 and its position relative to member $63^0$ are regulated by set-screws 79 and 80, passing through arm 72. 81 is a frame on the opposite side of brake-bar 63, provided with lugs 82, riding on bracket 69 and bar 73 and containing a socket in which bearing-ball 83, which is to serve as a brake-shoe, is inserted. 84 is a spiral spring inserted between frame 81 and a plate 85, which by means of suitable lugs is also capable of riding and traveling on yoke 69 73. Said spring may be tensioned by means of screw 86. $84^\times$ is a spring auxiliary to spring 84 and which can receive tension only after spring 84 has been tensioned to some extent. The faces of members $63^0$ and $63'$ are each provided with a groove into which balls 76 and 83, respectively, fit and within which the same travel, said balls in conjunction with said grooves forming universal joints, which provide for the necessary flexibility between the different parts. Joint 64 should be made sufficiently free to allow bar 63 to slightly oscillate toward and away from part A in case of relative movements in said directions by such part A and axle 11.

In Figs. 9 and 10 I show a continuous yoke 87, which may be fixedly attached to the body 10 of the vehicle. 88 is a solid brake-bar, having its two operative faces parallel, longitudinal corrugations 89 on one of said faces engaging with corresponding corrugations 90 on the convex braking-surface of a brake-shoe 91, which is made to ride on yoke 87 by means of lugs 92, which are allowed sufficient play so as to permit said brake-shoe to slightly revolve upon a universal joint 93, interposed between it and a shoe 94, which shoe is closely guided along said yoke by its flanges 95. 96 is the end portion of a rubber spring inserted within said yoke and adapted to enforce operative contact between brake-bar 88 and brake-shoe 91 on one side and a cam 97 forming a brake-shoe on the opposite side when the brake-bar is moving downward. Said cam is pivoted to the yoke by a pin 98, the operative cam-surface X Y being nearest to said pivot at X and further therefrom at Y. 99 and 100 are two lugs on said cam, lug 99 being adapted to engage with and to be arrested by a screw 101, passing through an abutment 102 on said yoke, and 100 to engage with a screw 103, passing through an abutment 104 on said yoke, whereby the extreme play of said cam may be regulated. The tension of spring 96 is so adjusted that as brake-bar 88 is moving upward it will contact with said cam under sufficient pressure to by its movement swing the same in the direction of the arrow in Fig. 10 until the portion X is brought directly opposite bar 88. This will allow spring 96 to expand sufficiently to reduce the frictional braking contact between shoes 91 and 97 and bar 88, so as to allow comparatively free upward movement of said bar, while upon its return movement it will swing cam 97 back into the position shown in Fig. 10 and will thereby produce increased compression of spring 96, and consequently increased braking action on said bar. The surface on bar 88 facing cam 97 I prefer to provide with a groove $89^x$, substantially fitting the rounded bearing-surface on said cam.

I do not wish to confine myself to the details and detail combinations above set forth, as the same might be varied materially without departing from the spirit of my invention. Other forms of stationary brake-shoes might be substituted for those illustrated, and rollers might be made to take the place of traveling bearing-balls 35 and 76. Instead of making the upper and the lower portions of grooves 58 straight they might also be made curving to assist in bringing about the results obtained in making the bearing-surfaces on the rear face of bar 20 cam-shaped. Instead of having two joints between brackets 3 and bar 20 one universal joint might be used. The brake-bar instead of being made sectional or compound might be made solid, and any suitable form of spring might be used instead of the spiral and rubber springs illustrated for enforcing operative contact between the brake-bar and the brake-shoes. Further, such springs might be so tensioned that at any stage of the movement of the brake-bar and also while the same is stationary and in its normal position braking action be produced. The brake-bar need not necessarily be made to move vertically and might be adjusted to move downward during direct action of spring 12 and upward during reaction of the same. A spring, as 50, might be placed behind a brake-shoe, as 44, on each side of the brake-bar 20. Where, however, a ball 35 or a roller adapted to travel on a frame 31 32 33 is to be used, such frame might be hinged at its upper end and provided with a spring in the rear of the lower end of said frame for forcing the latter toward the brake-bar. When required, the hinge of the brake-bar might be placed directly opposite casing 49, and, further, the brake-bar may be kept in contact with the brake-shoe only intermittently.

I claim—

1. The combination with two relatively movable portions of a structure, of a brake-shoe mounted upon one of said portions, a brake-bar mounted upon the other portion and adjusted to permit of longitudinal movements toward and away from said brake-shoe, means for forcing bar and brake-shoe one against the other in a direction lateral to said movements, and means for regulating the intensity of the force so applied to bar and shoe while the same occupy the same relative positions.

2. The combination with two relatively movable portions of a structure, of a brake-shoe mounted upon one of said portions, and a brake-bar pivoted to the other portion and adjusted to permit of movements of said bar and its pivot toward and away from said brake-shoe, means for swinging said bar toward said shoe, and means for regulating the extent of such swinging movements.

3. The combination with two relatively movable portions of a structure, of a pivot provided on one of said portions, a brake-bar capable of rocking around said pivot, a brake-shoe mounted upon the other portion and capable of movements toward and away from said brake-bar, means for swinging said bar toward said shoe and for moving said shoe in the plane in which said bar swings, and means for regulating the limit of such movements.

4. The combination with two relatively movable portions of a structure, of a brake-shoe mounted upon one of said portions, and a brake-bar flexibly connected to the other portion and capable of swinging in intersecting planes and adjusted to permit of movements toward and away from said brake-shoe and capable of partly revolving around said shoe, and means for forcing bar and brake-shoe one against the other in a direction lateral to said movements.

5. The combination with two relatively movable portions of a structure, of a brake-shoe mounted upon one of said portions, a brake-bar flexibly connected with the other portion and capable of swinging in intersecting planes and adjusted to permit of movements toward and away from said shoe, and of a vehicle, while I guard at the same time against binding between any of the parts of the structure during such movements. In employing hardened bearing-balls, as 35 and 44, as brake-shoes I not only obtain such spherical shoes at very low expense, but also permit of the brake-bar 20 assuming varying relative positions with reference to the same without varying the amounts of operative bearing-surfaces and without producing binding actions between the brake-bar and the brake-shoes. I am also enabled in case balls 44 should wear on one side to reverse the same and utilize their opposite sides. By having an independent bearing-plate, as 32, form part of frame 30 I am enabled to readily renew the same whenever necessary. By securing bar 1 between bearing E and spring C by means of yokes D, I firmly confine said bar and the joints integral therewith in their positions without the necessity of drilling any holes for such purpose in any portions of the vehicle. By employing an auxiliary spring, as 53, I am enabled to greatly add to the spring-power applied to the brake-shoes and the brake-bar when the latter departs considerably from its normal position. By making the yoke within which bar 20 moves up and down sectional I not only add to the flexibility of the device, but also greatly facilitate the mounting and adjustment of its parts. The air-cushioning device, embodying cylinder 8 and connecting parts, and the frictional braking device, embodying brake-bar 20 and the parts connecting therewith, are so arranged and proportioned that when ball 44 occupies the position indicated in dotted lines opposite part $b'$ of bar 20 piston 11 will be opposite part $b$ of cylinder 8 and that when ball 44 is placed in the position $c'$ the piston will be opposite points $c$ in said cylinder so that as reversals in the movements of said piston and said bar take place simultaneously perfect freedom will be allowed in such movements at those times.

While it will be observed that the air-cushioning devices may each be employed independent of the other for regulating the actions of spring C as well as the frictional braking mechanism, I prefer to employ the same jointly, as the frictional braking device will take care of rough shocks, while the air-cushioning device will moderate and soften the action of the same.

In place of the air-cushioning device above referred to any other suitable device of this character—as, for instance, the one illustrated in Fig. 2 of my United States Patent No 689,969—might be employed in combination with the frictional braking mechanism described.

By employing in combination with spring C a braking device for regulating and for yieldingly resisting the action of said spring and an auxiliary spring or bolster or buffer, as F, I am enabled to not only materially reduce the injurious tensions which would otherwise be imparted to spring C, but also to moderate and regulate the actions of said spring by a less powerful and much more sensitive braking device and having less play and being of smaller dimensions than would have to be employed otherwise.

In the modified braking device illustrated in Figs. 7 and 8 a compound brake-bar 63 is hinged at 64 to two clamps 65, secured to axle 11 by bolts 66. Said brake-bar consists of the two members $63^0$ and $63'$, jointed together at their upper ends by a pin 67, and of a screw $63^\times$, passing through member $63'$ and resting upon member $63^0$ for adjusting the relative positions of such members. 68 68 are lugs on member $63'$ for preventing relative lateral displacements of such members. 69 is a double bracket fixedly attached to body 10 by bolts 70, its two arms 71 and 72 extending forward and being connected by a bar 73, locking into suitable recesses in said arms and secured thereto by screws 74. Bar 63 passes through the yoke formed by said bracket and said bar 73. 75 is a frame similar to frame 30, but made of one piece and carrying only one ball 76, which is permitted to travel upward and downward within socket 77 on said frame. Frame 75 is provided with lugs 78, made to ride upon bracket 69 and bar 73. The inclination of frame 75 and its position relative to member $63^0$ are regulated by set-screws 79 and 80, passing through arm 72. 81 is a frame on the opposite side of brake-bar 63, provided with lugs 82, riding on bracket 69 and bar 73 and containing a socket in which bearing-ball 83, which is to serve as a brake-shoe, is inserted. 84 is a spiral spring inserted between frame 81 and a plate 85, which by means of suitable lugs is also capable of riding and traveling on yoke 69 73. Said spring may be tensioned by means of screw 86. $84^\times$ is a spring auxiliary to spring 84 and which can receive tension only after spring 84 has been tensioned to some extent. The faces of members $63^0$ and $63'$ are each provided with a groove into which balls 76 and 83, respectively, fit and within which the same travel, said balls in conjunction with said grooves forming universal joints, which provide for the necessary flexibility between the different parts. Joint 64 should be made sufficiently free to allow bar 63 to slightly oscillate toward and away from part A in case of relative movements in said directions by such part A and axle 11.

In Figs. 9 and 10 I show a continuous yoke 87, which may be fixedly attached to the body 10 of the vehicle. 88 is a solid brake-bar, having its two operative faces parallel, longitudinal corrugations 89 on one of said faces engaging with corresponding corrugations 90 on the convex braking-surface of a brake-shoe 91, which is made to ride on yoke 87 by means of lugs 92, which are allowed sufficient play so as to permit said brake-shoe to slightly revolve upon a universal joint 93, interposed between it and a shoe 94, which shoe is closely guided along said yoke by its flanges 95. 96 is the end portion of a rubber spring inserted within said yoke and adapted to enforce operative contact between brake-bar 88 and brake-shoe 91 on one side and a cam 97 forming a brake-shoe on the opposite side when the brake-bar is moving downward. Said cam is pivoted to the yoke by a pin 98, the operative cam-surface X Y being nearest to said pivot at X and further therefrom at Y. 99 and 100 are two lugs on said cam, lug 99 being adapted to engage with and to be arrested by a screw 101, passing through an abutment 102 on said yoke, and 100 to engage with a screw 103, passing through an abutment 104 on said yoke, whereby the extreme play of said cam may be regulated. The tension of spring 96 is so adjusted that as brake-bar 88 is moving upward it will contact with said cam under sufficient pressure to by its movement swing the same in the direction of the arrow in Fig. 10 until the portion X is brought directly opposite bar 88. This will allow spring 96 to expand sufficiently to reduce the frictional braking contact between shoes 91 and 97 and bar 88, so as to allow comparatively free upward movement of said bar, while upon its return movement it will swing cam 97 back into the position shown in Fig. 10 and will thereby produce increased compression of spring 96, and consequently increased braking action on said bar. The surface on bar 88 facing cam 97 I prefer to provide with a groove $89^x$, substantially fitting the rounded bearing-surface on said cam.

I do not wish to confine myself to the details and detail combinations above set forth, as the same might be varied materially without departing from the spirit of my invention. Other forms of stationary brake-shoes might be substituted for those illustrated, and rollers might be made to take the place of traveling bearing-balls 35 and 76. Instead of making the upper and the lower portions of grooves 58 straight they might also be made curving to assist in bringing about the results obtained in making the bearing-surfaces on the rear face of bar 20 cam-shaped. Instead of having two joints between brackets 3 and bar 20 one universal joint might be used. The brake-bar instead of being made sectional or compound might be made solid, and any suitable form of spring might be used instead of the spiral and rubber springs illustrated for enforcing operative contact between the brake-bar and the brake-shoes. Further, such springs might be so tensioned that at any stage of the movement of the brake-bar and also while the same is stationary and in its normal position braking action be produced. The brake-bar need not necessarily be made to move vertically and might be adjusted to move downward during direct action of spring 12 and upward during reaction of the same. A spring, as 50, might be placed behind a brake-shoe, as 44, on each side of the brake-bar 20. Where, however, a ball 35 or a roller adapted to travel on a frame 31 32 33 is to be used, such frame might be hinged at its upper end and provided with a spring in the rear of the lower end of said frame for forcing the latter toward the brake-bar. When required, the hinge of the brake-bar might be placed directly opposite casing 49, and, further, the brake-bar may be kept in contact with the brake-shoe only intermittently.

I claim—

1. The combination with two relatively movable portions of a structure, of a brake-shoe mounted upon one of said portions, a brake-bar mounted upon the other portion and adjusted to permit of longitudinal movements toward and away from said brake-shoe, means for forcing bar and brake-shoe one against the other in a direction lateral to said movements, and means for regulating the intensity of the force so applied to bar and shoe while the same occupy the same relative positions.

2. The combination with two relatively movable portions of a structure, of a brake-shoe mounted upon one of said portions, and a brake-bar pivoted to the other portion and adjusted to permit of movements of said bar and its pivot toward and away from said brake-shoe, means for swinging said bar toward said shoe, and means for regulating the extent of such swinging movements.

3. The combination with two relatively movable portions of a structure, of a pivot provided on one of said portions, a brake-bar capable of rocking around said pivot, a brake-shoe mounted upon the other portion and capable of movements toward and away from said brake-bar, means for swinging said bar toward said shoe and for moving said shoe in the plane in which said bar swings, and means for regulating the limit of such movements.

4. The combination with two relatively movable portions of a structure, of a brake-shoe mounted upon one of said portions, and a brake-bar flexibly connected to the other portion and capable of swinging in intersecting planes and adjusted to permit of movements toward and away from said brake-shoe and capable of partly revolving around said shoe, and means for forcing bar and brake-shoe one against the other in a direction lateral to said movements.

5. The combination with two relatively movable portions of a structure, of a brake-shoe mounted upon one of said portions, a brake-bar flexibly connected with the other portion and capable of swinging in intersecting planes and adjusted to permit of movements toward and away from said shoe, and means for forcing bar and brake-shoe one against the other in a direction lateral to said movements.

6. The combination with two relatively movable portions of a structure, of a frame mounted upon one of said portions, a casing carrying a suitable braking-surface mounted upon said frame, a brake-bar mounted upon the other portion and adjusted to reciprocate toward and away from said braking-surface, means for resisting movements of said casing in the direction of the reciprocating movement of said bar, and means for yieldingly resisting movements of said casing at right angles to said reciprocating movement.

7. The combination with two relatively movable portions of a structure, of a frame mounted upon one of said portions, a brake-shoe mounted upon said frame, a brake-bar mounted upon the other portion, means for adjusting the position of said frame relative to the portion of the structure upon which it is mounted while said relatively movable portions of the structure maintain their relative positions, and means for enforcing braking action between said bar and said shoe.

8. The combination with two relatively movable portions of a structure, of a brake-shoe mounted upon one of said portions, a brake-bar mounted upon the other portion and adjusted to successively have different portions of its surface contact with said brake-shoe, a spring for holding bar and brake-shoe one against the other, and screw-thread arrangement for adjusting the tension of said spring.

9. The combination with two relatively movable portions of a structure, of a brake-shoe mounted upon one of said portions, a brake-bar mounted upon the other portion and adjusted to successively have different portions of its surface contact with said brake-shoe, a spring for holding bar and brake-shoe one against the other, means for adjusting the tension of said spring, while brake-bar and brake-shoe occupy the same relative positions.

10. The combination with two relatively movable portions of a structure, of a brake-shoe mounted upon one of said portions, a brake-bar mounted upon the other portion and adapted to successively have different portions of its surface contact with said brake-shoe, and two springs adjusted to successively produce frictional braking action between brake-bar and brake-shoe.

11. The combination with two relatively movable portions of a structure, of a brake-shoe mounted upon one of said portions, a brake-bar mounted upon the other portion and adapted to successively have different portions of its surface contact with said brake-shoe, a spring for holding bar and brake-shoe one against the other, a second spring for intermittently producing pressure between brake-bar and brake-shoe, and means for adjusting the extent to which the first spring is to be actuated before actuating the second spring.

12. The combination with two relatively movable portions of a structure, of a brake-bar mounted upon one of said portions, a sectional frame provided with a suitable braking-surface for engaging with said bar mounted upon the other portion, and means for forcing bar and frame one toward the other, a joint being provided between the sections of said frame for permitting rocking movement of one of said sections upon the other.

13. The combination with two relatively movable portions of a structure, of a brake-bar mounted upon one of said portions, a sectional frame provided with a suitable braking-surface for engaging with said bar mounted upon the other portion, and means for forcing bar and braking-surface one toward the other, a hinged joint being provided between the sections of said frame.

14. The combination with two relatively movable portions of a structure, of a brake-shoe mounted upon one of said portions, a brake-bar mounted upon the other portion and adjusted to reciprocate with reference to said brake-shoe, means for forcing bar and brake-shoe one against the other, and means for producing different degrees of friction between a given surface on said brake-shoe and two given surfaces on said bar successively engaging therewith, and means for varying the differences in the degrees of friction so produced.

15. The combination with two relatively movable portions of a structure, of a brake-shoe mounted upon one of said portions, a brake-bar mounted upon the other portion, and means for producing friction between a given surface on said bar and a given surface on said shoe while one is moving with reference to the other, and automatic means for producing a different degree of friction between the same surfaces while bar and shoe are moving in a different direction, one with reference to the other.

16. The combination with two relatively movable portions of a structure, of a brake-shoe mounted upon one of said portions, a bar mounted upon the other portion and adjusted to reciprocate with reference to said brake-shoe, and means for successively producing braking action between bar and brake-shoe, and automatically interrupting such braking action while the bar is traveling in the same direction and facing said brake-shoe.

17. The combination with two relatively movable portions of a structure, of a brake-shoe mounted upon one of said portions, and a sectional brake-bar mounted upon the other portion, means applied to one of the sections of said bar for producing braking action between its other section and said shoe, and means for varying the relative positions of said sections.

18. The combination with two relatively movable portions of a structure, of a brake-shoe mounted upon one of said portions, a sectional brake-bar mounted upon the other portion, a hinge between the sections of said bar, a stay between said sections, and means applied to one of the sections of said bar for producing braking action between its other section and said shoe.

19. The combination with two relatively movable portions of a structure, of a brake-shoe mounted upon one of said portions, a sectional brake-bar mounted upon the other portion, a hinge between the sections of said bar, means for guiding one of the sections of said bar upon the other section, a stay between said sections, and means applied to one of said sections for producing braking action between the other section and said shoe.

20. The combination with two relatively movable portions of a structure, of two brake-shoes mounted upon one of said portions and a sectional brake-bar mounted upon the other portion, one of said shoes engaging with one of the sections of the brake-bar, and the other shoe engaging with the other section, and means for varying the relative positions of said sections while in engagement with said shoes.

21. The combination with two relatively movable portions of a structure, of two brake-shoes mounted upon one of said portions and a sectional brake-bar mounted upon the other portion, one of said shoes engaging with one of the sections of the brake-bar and the other shoe engaging with the other section, means for producing variations in the relative positions of said sections, and means for yieldingly resisting such variations.

22. The combination with two relatively movable portions of a structure, of a bar attached to one of said portions, two brake-shoes on opposite sides of said bar adjusted to engage with said bar, said bar being capable of sliding toward and away from said shoes, and means for exerting yielding pressure upon said bar and said brake-shoes lateral to the direction of the travel of said bar.

23. The combination with two relatively movable portions of a structure, of a brake-shoe mounted upon one of said portions and a brake-bar mounted upon the other portion and adjusted to reciprocate with reference to said shoe while producing braking action in contact therewith, portion of the operative braking-surface of said bar being made receding with reference to another portion of such surface made to engage with said shoe at another period of such movement of the bar.

24. The combination with two relatively movable portions of a structure, of a spherical brake-shoe mounted upon one of said portions, a brake-bar mounted upon the other portion and adjusted to reciprocate with reference to said brake-shoe, and means for forcing bar and shoe one against the other.

25. The combination with two relatively movable portions of a structure, of a spherical brake-shoe mounted upon one of said portions, a brake-bar mounted upon the other portion and adjusted to reciprocate with reference to said brake-shoe, and means for yieldingly forcing bar and shoe one against the other.

26. The combination with two relatively movable portions of a structure, of a spherical brake-shoe mounted upon one of said portions, a brake-bar mounted upon the other portion, a groove being provided along which said shoe is made to travel, and a spring for forcing bar and shoe one against the other.

27. The combination with two relatively movable portions of a structure, of a multiplicity of spherical brake-shoes mounted upon one of said portions, a brake-bar mounted upon the other portion and adjusted to impart simultaneous movements in the same directions to said shoes, and means for yieldingly forcing bar and shoes one against the other.

28. The combination with two relatively movable portions of a structure, of a frame mounted upon one of said portions, a spherical brake-shoe inserted in a socket substantially confining said shoe in its position upon said frame, a brake-bar mounted upon the other section, and means for yieldingly forcing bar and brake-shoe one against the other.

29. The combination with two relatively movable portions of a structure, of a brake-shoe mounted upon one of said portions, a brake-bar mounted upon the other portion and adjusted to reciprocate with reference to said brake-shoe, said bar being provided with a groove along which said brake-shoe moves during braking action.

30. The combination with two relatively movable portions of a structure, of a brake-shoe with convex bearing-surface mounted upon one of said portions and a brake-bar mounted upon the other portion and provided with an undulating bearing-surface, the undulations on said surface being adapted to successively engage with said brake-shoe.

31. The combination with two relatively movable portions of a structure, of two brake-shoes mounted upon one of said portions, and a brake-bar mounted upon the other portion and provided with two undulating faces, the undulations on one of said faces being adapted to successively engage with one of said brake-shoes, and the undulations on the other face being adapted to successively engage with the other brake-shoe.

32. The combination with two relatively movable portions of a structure, and a brake-shoe mounted upon one of said portions, a brake-bar mounted upon the other portion, and means for producing braking action between said bar and said shoe while the bar is moving in one direction and for displacing said brake-shoe with reference to the portion of the structure upon which it is mounted while the bar is moving in another direction.

33. The combination with two relatively movable portions of a structure, of a brake-shoe mounted upon one of said portions, a brake-bar mounted upon the other portion, and means for producing braking action between said bar and said shoe while the bar is moving in one direction and for automatically displacing said brake-shoe with reference to the portion of the structure upon which it is mounted while the bar is moving in another direction.

34. The combination with two relatively movable portions of a structure, of two brake-shoes mounted upon one of said portions and a brake-bar mounted upon the other portion, and means for producing braking action between said bar and both shoes while the bar is moving in one direction, and for displacing one of said shoes with reference to the other shoe while the bar is moving in the opposite direction.

35. The combination with two relatively movable portions of a structure, of a brake-bar mounted upon one of said portions, a brake-shoe mounted upon the other portion, and means for successively enforcing rolling and sliding frictional braking action between bar and shoe, while bar and shoe are moving one with reference to the other.

36. The combination with two relatively movable portions of a structure, of a brake-bar mounted upon one of said portions, a frame mounted upon the other portion, a brake-shoe capable of rolling upon the same, and means for successively enforcing frictional braking action during relative reciprocating movements of bar and shoe and while said shoe is rolling upon said frame and also while it is stationary with reference to said frame.

37. The combination with two relatively movable portions of a structure, of a frame mounted upon one of said portions, a bearing-ball capable of traveling upon said frame, a brake-bar adapted to move said ball in different directions upon said frame, and a spring for forcing said bar toward said ball and for thereby varying the distance between said ball and one of the seats of said spring.

38. The combination with two relatively movable portions of a structure, of a frame mounted upon one of said portions, a depression being provided upon said frame, a bearing-ball adapted to travel within said depression, a brake-bar adapted to impart reciprocating movement to said ball in said depression, and means for producing a greater frictional contact between bar and ball while said ball is resting against one portion of said depression, than while it is resting against another such portion.

39. The combination with two relatively movable portions of a structure, of a frame mounted upon one of said portions, a bearing-ball capable of traveling upon said frame, a brake-bar adapted to move said ball upward and adjusted to have braking action imparted to it by said ball upon downward movement of the same.

40. The combination with two relatively movable portions of a structure, of a frame mounted upon one of said portions, a brake-shoe capable of rolling upon said frame, a brake-bar adapted to roll said brake-shoe upward and adjusted to have braking action imparted to it by said brake-shoe when the same rolls downward.

41. The combination with two relatively movable portions of a structure, of a frame mounted upon one of said portions, a brake-shoe capable of rolling upon said frame, a brake-bar adapted to roll said brake-shoe in different directions along said frame, and a spring for forcing said bar toward said shoe and for thereby varying the distance between said shoe and one of the seats of said spring.

42. The combination with two relatively movable portions of a structure, of a frame mounted upon one of said portions, a brake-shoe, a brake-bar adapted to roll said brake-shoe in different directions along said frame, and means for automatically increasing and reducing the friction between said bar and said shoe, and also for dispensing with braking actions while said bar moves opposite said shoe.

43. The combination with two relatively movable portions of a structure, of a frame mounted upon one of said portions, a brake-shoe, a brake-bar adapted to roll said shoe in different directions along said frame, and means for varying the inclination of the path of said shoe with reference to said bar.

44. The combination with two relatively movable portions of a structure, of a brake-bar mounted upon one of said portions, a frame mounted upon the other portion, a brake-shoe adapted to be moved along said frame by said bar, said frame comprising a detachable bearing-plate along which said brake-shoe travels, and means for forcing said bar against said brake-shoe and said shoe against said plate.

45. The combination with two relatively movable portions of a structure, of a brake-shoe mounted upon one of said portions, a brake-bar mounted upon the other portion and adjusted to oscillate toward and away from the portion of the structure upon which said brake-shoe is mounted, during relative movements of the portions of said structure.

46. The combination with two relatively movable portions of a structure, of a brake-shoe mounted upon one of said portions, and a brake-bar mounted upon the other portion and adapted to produce braking action upon said shoe during relative movements of said portions of the structure and during movements of said bar opposite said shoe and means for automatically interrupting such braking action while brake-bar and brake-shoe are continuing to travel one opposite the other.

47. The combination with two relatively movable portions of a structure, of a yoke flexibly mounted upon one of said portions, a brake-shoe supported upon the arms of said yoke and adapted to move along the same, a brake-bar in engagement with said shoe, and a spring having its seats supported upon said yoke and adapted to force said shoe toward said bar.

48. The combination with two relatively movable portions of a structure, of a yoke mounted upon one of said portions, a casing mounted upon said yoke, a brake-shoe mounted upon said casing, a brake-bar in engagement with said shoe, and means for varying the relative positions of said casing and said shoe.

49. The combination with two relatively movable portions of a structure, of a yoke mounted upon one of said portions, a casing mounted upon and adjusted to travel along said yoke, a brake-shoe mounted upon said casing, a brake-bar mounted upon the other portion, and means for forcing bar and casing one toward the other.

50. The combination with two relatively movable portions of a structure, of a brake-bar mounted upon one of said portions, a brake-shoe mounted upon the other portion and interposed between the same and said bar, screw-thread arrangement for adjusting the relative positions of said brake-shoe and the portion of the structure upon which it is mounted, and means for forcing said bar against said shoe.

51. The combination with two relatively movable portions of a structure, of a yoke mounted upon one of said portions, a brake-shoe mounted upon said yoke, a brake-bar mounted upon the other portion and adjusted to extend through said brake-shoe while in operative engagement with said yoke, means for holding bar and shoe one against the other and a sectional casing around said bar and said shoe and divided along said yoke.

52. The combination with two relatively movable portions of a structure, of a sectional yoke mounted upon one of said portions, a brake-shoe mounted upon said yoke in the space between its sections, and a brake-bar mounted upon the other portion, said bar being made to coact with said shoe within such space, and means for forcing bar and shoe one against the other.

53. The combination with two relatively movable portions of a structure, of a brake-shoe mounted upon one of said portions, a brake-bar mounted upon the other portion and adjusted to reciprocate with reference to said brake-shoe, means for varying the distance between the free end of the brake-bar and the portion of the structure upon which said bar is mounted, and means for forcing bar and shoe one against the other.

54. The combination with two relatively movable portions of a structure, of a spring interposed between the same, a brake-shoe mounted upon one of said portions, a brake-bar mounted upon the other portion and adjusted to reciprocate with reference to said shoe during actions and reactions of said spring, and means for forcing bar and shoe one toward the other, and means for regulating the intensity of the force so applied to bar and shoe while they occupy the same relative positions.

55. The combination with two relatively movable portions of a structure, of a spring interposed between the same, a brake-bar mounted upon one of said portions, a brake-shoe mounted upon the other portion, means for producing stronger frictional braking action between said bar and said shoe while the spring is reacting, than during direct actions of said spring, and means for varying the differences between such frictional braking actions while brake-bar and brake-shoe occupy corresponding relative positions.

56. The combination with two relatively movable portions of a structure, of a spring interposed between the same, a brake-bar mounted upon one of said portions and a brake-shoe mounted upon the other portion, and means for producing stronger frictional braking action between said bar and said shoe during extensive direct actions of said spring than during more moderate direct actions.

57. The combination with two relatively movable portions of a structure, of a spring interposed between the same, a brake-bar mounted upon one of said portions, a brake-shoe mounted upon the other portion, means for producing stronger frictional braking action between said bar and said shoe while the spring is reacting than during direct actions of said spring, a second spring for forcing brake-bar and brake-shoe one against the other, and means for adjusting the tension of said spring.

58. The combination with two relatively movable portions of a structure, of a spring interposed between the same, a brake-bar mounted upon one of said portions and a brake-shoe mounted upon the other portion, and means for enforcing braking contact between bar and shoe while the spring is acting and to have the same out of braking contact while the spring is not acting.

59. The combination with two relatively movable portions of a structure, of a spring interposed between the same, a brake-bar mounted upon one of said portions and a brake-shoe mounted upon the other portion, and means for producing weaker frictional braking action between said bar and said shoe during extensive direct actions of said spring than during more moderate direct actions.

60. The combination with two relatively movable portions of a structure, of a spring interposed between the same, a brake-bar mounted upon one of said portions and a brake-shoe mounted upon the other portion, and means for producing weaker frictional braking action between said bar and said shoe during extensive reactions of said spring than during more moderate reactions.

61. The combination with two relatively movable portions of a structure, of a spring interposed between the same, a brake-bar mounted upon one of said portions and a brake-shoe mounted upon the other portion, and means for producing stronger frictional braking action between said bar and said shoe during extensive direct actions and reactions of said spring than during more moderate direct actions and reactions.

62. The combination with two relatively movable portions of a structure, of a spring interposed between the same, a brake-bar mounted upon one of said portions and a brake-shoe mounted upon the other portion, and means for producing weaker frictional braking action between said bar and said shoe during extensive direct actions and reactions of said spring than during more moderate direct actions and reactions.

63. The combination with two relatively movable portions of a structure, of a spring interposed between the same, a brake-bar mounted upon one of said portions and a brake-shoe mounted upon the other portion, and means for producing stronger frictional braking actions during direct actions of said spring and during reactions of said spring beyond its normal condition than while said spring occupies intermediate positions.

64. The combination with two relatively movable portions of a structure, of a spring interposed between the same, a brake-bar mounted upon one of said portions and a brake-shoe mounted upon the other portion, and means for producing stronger frictional braking actions while the spring is under tension greater than its normal tension than when it is under tension less than its normal tension.

65. The combination with two relatively movable portions of a structure, of a spring interposed between the same, a brake-bar provided with a cam-surface mounted upon one of said portions, and a brake-shoe with a curving braking-surface mounted upon the other portion, and elastic means for enforcing operative frictional contact between said braking-surface and said cam-surface during reactions of said spring.

66. The combination with two relatively movable portions of a structure, of a spring interposed between the same, a frame mounted upon one of said portions, a brake-shoe capable of traveling upon said frame, a brake-bar adjusted to move said brake-shoe upward during direct action of said spring and to have braking action imparted to it by said brake-shoe upon reaction of said spring.

67. The combination with two relatively movable portions of a structure of a spring interposed between the same, a frame mounted upon one of said portions, a brake-shoe capable of traveling upon said frame, and a brake-bar adjusted to roll said brake-shoe upward during direct action of said spring, said brake-shoe being adjusted to roll downward during reaction of said spring.

68. The combination with two relatively movable portions of a structure, of a spring interposed between the same, a brake-bar mounted upon one of said portions, a brake-shoe mounted upon the other portion, and means for enforcing greater frictional braking action between said bar and said shoe when the spring is moving between its normal position and an extreme position, than when it is changing the direction of its movement while in such extreme position.

69. The combination with two relatively movable portions of a structure, of a spring interposed between the same, and means for permitting free direct action of said spring and for applying frictional braking action during reaction of said spring.

70. The combination with two relatively movable portions of a structure, of a spring interposed between the same, and means for permitting free action of said spring while the same is moving in one direction, and for applying frictional braking action while said spring is moving in the opposite direction.

71. The combination with two relatively movable portions of a structure, of a spring interposed between the same, and means for permitting free action of said spring during part of its travel in one direction and for applying frictional braking action during another part of such travel in the same direction.

72. The combination with two relatively movable portions of a structure, of a spring interposed between the same, and means for permitting free action of said spring during part of its travel in one direction, for applying braking action during another part of such travel in the same direction, and for applying braking action throughout its return travel.

73. The combination with two relatively movable portions of a structure, of a spring interposed between the same, means for retaining said spring in its position upon one of said portions, and a device comprising relatively movable parts for regulating the action of said spring, one of said parts of the regulating device being confined in its proper position relative to one of said portions of the structure by the means for retaining said spring in its position.

74. The combination with two relatively movable portions of a structure, of a spring interposed between the same, said spring comprising a multiplicity of leaves, a yoke for retaining said leaves in their proper relative positions, a device comprising relatively movable parts for regulating the action of said spring, one of said parts of the regulating device being held in its proper position relative to one of said portions of the structure by said yoke.

75. The combination with two relatively movable portions of a structure, of a spring interposed between the same and comprising a multiplicity of leaves placed lengthwise with reference to each other, a yoke retaining said leaves in their proper relative positions, a device for comprising relatively movable parts for regulating the action of said spring, and a plate held in position by said yoke, a part of said regulating device being hinged to said plate and adjusted to swing in a plane parallel with the plane in which said spring is being actuated.

76. The combination with two relatively movable portions of a structure, of a leaf-spring interposed between the same, yokes for confining said spring in contact with one of said movable portions, a plate interposed between said yokes and said movable portion and provided with a lug extending at right angles from said plate, and a device for regulating the action of said spring articulated to said lug.

77. The combination with two relatively movable portions of a structure, of a spring interposed between the same, an air-check, a friction-brake, and means for simultaneously actuating said air-check and said friction-brake during relative displacements of the two portions of said structure.

78. The combination with two relatively movable portions of a structure, of a spring interposed between the same, an air-check, a friction-brake, means for simultaneously actuating said air-check and said friction-brake during relative displacements of the two portions of said structure, and means for providing greater resistance in said frictional braking device to reactions of said spring than to corresponding direct actions.

79. The combination with two relatively movable portions of a structure, of a spring interposed between the same, an air-check, a friction-brake, means for simultaneously actuating said air-check and said friction-brake during relative displacements of the two portions of said structure, and means for providing greater resistance in said air-check and in said friction-brake to reactions of said spring than to direct actions of the same.

80. The combination with two relatively movable portions of a structure, of a spring interposed between the same, an air-check, a friction-brake, means for simultaneously actuating said air-check and said friction-brake during relative displacements of the two portions of said structure, and means for keeping said air-check and said friction-brake out of action while said spring is occupying its normal position.

81. The combination with two relatively movable portions of a structure, of a spring interposed between the same, an air-check, a friction-brake, and joint means for attaching said air-check and said friction-brake to said relatively movable portions of the structure.

82. The combination with two relatively movable portions of a structure, of a spring interposed between the same, a friction-brake, an air-check comprising a cylinder, and a piston movable therein, the interior diameter of said cylinder being enlarged opposite the position occupied by said piston when the spring is in its normal position, the friction-brake and the air-check being adapted to be actuated simultaneously during relative movements of the portions of the structure.

83. The combination with two relatively movable portions of a structure, of a spring interposed between the same, a friction-brake, an air-check comprising a cylinder, and a piston movable therein, the interior diameter of said cylinder being enlarged opposite the position occupied by the piston corresponding with an extreme position occupied by the spring, the friction-brake and the air-check being adapted to be actuated simultaneously during relative movements of the portions of the structure.

84. The combination with two relatively movable portions of a structure, of a main spring interposed between the same, an auxiliary spring adapted to come into action after initial direct action of aforesaid spring, and a braking device for controlling the action of the main spring within the limits permitted by the auxiliary spring.

85. The combination with two relatively movable portions of a structure, of a main spring interposed between the same, an auxiliary spring adapted to come into action after initial direct action of aforesaid spring, and a friction-brake adjusted to control movements of said main spring while said auxiliary spring is not in operation.

86. The combination with two relatively movable portions of a structure, of a main spring interposed between the same, an auxiliary spring adapted to come into action after initial direct action of aforesaid spring, and a friction-brake adjusted to control the actions of said main spring and of said auxiliary spring.

In testimony whereof I have signed my name to this specification, in the presence of two subscribing witnesses, this 14th day of March, 1905.

CHARLES L. HORACK.

Witnesses:
HUGO R. M. MOELLER,
M. FLINT.